US011640155B2

(12) United States Patent
Tappan et al.

(10) Patent No.: US 11,640,155 B2
(45) Date of Patent: May 2, 2023

(54) CUSTOMIZABLE WORKFLOWS FOR MACHINERY MANAGEMENT

(71) Applicant: Baker Hughes Oilfield Operations LLC, Houston, TX (US)

(72) Inventors: Jackie Tappan, Minden, NV (US); Eric Gilchrist, Minden, NV (US); Jakub Berlinski, Minden, NV (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 57 days.

(21) Appl. No.: 17/081,619

(22) Filed: Oct. 27, 2020

(65) Prior Publication Data

US 2021/0141359 A1    May 13, 2021

Related U.S. Application Data

(60) Provisional application No. 62/932,442, filed on Nov. 7, 2019.

(51) Int. Cl.
  *G06F 3/0482*    (2013.01)
  *G05B 19/4065*   (2006.01)
  *G06F 3/0483*    (2013.01)
  *G06F 9/54*      (2006.01)
  *G05B 23/02*     (2006.01)
  (Continued)

(52) U.S. Cl.
  CPC ....... *G05B 19/4065* (2013.01); *G06F 3/0482* (2013.01); *G06F 3/0483* (2013.01); *G06F 9/54* (2013.01); *G05B 23/0216* (2013.01); *G05B 23/0272* (2013.01); *G05B 2219/24104* (2013.01); *G06F 9/4451* (2013.01); *G06F 9/451* (2018.02)

(58) Field of Classification Search
  CPC ...... G05B 19/4065; G05B 2219/24104; G05B 23/0272; G05B 23/0216; G06F 9/54; G06F 9/451; G06F 9/4451; G06F 3/0482; G06F 3/0483
  USPC .......................................................... 702/1
  See application file for complete search history.

(56) References Cited

U.S. PATENT DOCUMENTS

2004/0186927 A1* 9/2004 Eryurek .............. G06Q 10/063
                                                    710/12
2007/0240071 A1* 10/2007 Sherrill ............. G05B 23/0267
                                                    715/764

(Continued)

*Primary Examiner* — Dino Kujundzic
*Assistant Examiner* — Jianmei F Duckworth
(74) *Attorney, Agent, or Firm* — Mintz Levin Cohn Ferris Glovsky and Popeo, PC

(57) ABSTRACT

A condition monitoring system can include a memory and a processor. The memory can receive datasets associated with respective ones of a plurality of components in an industrial environment. The components can include machines and devices. The processor can receive datasets from the memory and generate a first GUI. The first GUI can display, in a first GUI portion, a hierarchical component list and a list of views for the components. The first GUI can also display, in a second GUI portion, a first visualization defined by a first hierarchical list component and a first view of list of views. The first GUI can further display a first navigation object overlaid with the first visualization. The first navigation object can be associated with a second visualization, different from the first visualization. The second GUI portion to display the second visualization in response to selection of the first navigation object.

20 Claims, 13 Drawing Sheets

(51) Int. Cl.
    *G06F 9/451*      (2018.01)
    *G06F 9/445*      (2018.01)

(56) References Cited

U.S. PATENT DOCUMENTS

2012/0259436 A1* 10/2012 Resurreccion ..... G05B 23/0216
                                                   700/17
2014/0108985 A1*  4/2014 Scott ................... G06F 3/0484
                                                   715/771
2015/0143211 A1*  5/2015 Kaufthal .............. G06F 40/134
                                                   715/205

* cited by examiner

CUSTOMIZABLE WORKFLOWS FOR MACHINERY MANAGEMENT

CROSS-REFERENCE TO RELATED APPLICATIONS

This application claims the benefit of U.S. Provisional Patent Application No. 62/932,442, filed on Nov. 7, 2019, and entitled "Customizable Workflows For Machinery Management," the entirety of which is incorporated by reference.

BACKGROUND

Many process-intensive industries, such as hydrocarbon refining and power generation, can rely heavily upon operation of machinery, and in some instances, continuous operation of machinery. In these environments, failure of one or more machines can incur significant costs due to repair expenses as well as loss of production and potential injury to workers. Given these risks, it can be common to monitor certain operating parameters of one or more components of an industrial operation. Measurements of the operating parameters can provide an indication of the mechanical condition of a machine component, allowing preventative maintenance (e.g., repair, replacement, etc.) to be performed on the machine component prior to failure. This condition monitoring can provide one or more long term benefits, such as lower production costs, reduced equipment down time, improved reliability, and enhanced safety.

SUMMARY

Condition monitoring systems can be configured to provide a variety of tools to facilitate identification and diagnosis of machine faults. Tools can include setting and display of current status according to analysis of measured parameters, summaries of events (e.g., warnings alarms, etc.), plots of current measurements/analyses, historical measurements/analyses, and comparisons thereof, amongst other. These tools can be accessed via a graphical user interface (GUI) of a human machine interface (HMI), allowing for selection and display.

However, not every user employs the same tools of a condition monitoring system in the same way. In one example, different users at the same site (e.g., basic users and expert users) can employ the same tools but employ different workflows in which tools are accessed in different orders. In another example, different users at different sites (e.g., a refinery versus a paper plant) can utilize a different set of tools altogether.

In addition, navigational flow between applications implanting different tools of a condition monitoring system can be challenging. As an example, when transitioning between a first-line analysis tool and a deep diagnostic tool, it can be difficult to retain context of the machine component that is being investigated.

Accordingly, systems and methods are provided for improved graphical user interfaces (GUIs). The improved GUIs can be employed in conjunction with condition monitoring systems, allowing users to customize workflows based upon their personal preferences. As discussed in greater detail below, a GUI builder allows users to define and customize their workflows. Beneficially, this allows users to more efficiently leverage the mix of tools that are important for them to manage their machinery fleet.

In an embodiment, a condition monitoring system is provided and it can include a memory and a processor. The memory can be configured to receive one or more datasets associated with respective ones of a plurality of components in an industrial environment. The components can include machines and devices configured to acquire operating parameters measured directly from the sensors and calculated therefrom. The processor can be configured to receive the one or more datasets from the memory and to generate a first graphical user interface (GUI). The first GUI can be configured to display, in a first portion of the first GUI, a hierarchical list of the components and a list of display views corresponding to respective components of the hierarchical list. The first GUI can also be configured to display, in a second portion of the first GUI, a first visualization defined by a first component selected from the hierarchical list and a first display view selected from the list of display views. The first GUI can be further configured to display a first navigation object overlaid with the first visualization. The first navigation object can be associated with a second visualization, different from the first visualization. The first GUI can be additionally configured to update the second portion of the first GUI to display the second visualization in response to selection of the first navigation object.

In another embodiment, the second visualization can be defined by a second component, the first component can be positioned at a first level of the hierarchical list, and the second component can be positioned at a second level of the hierarchical list. The first and second levels can be separated by at least one third level.

In another embodiment, the second visualization can be defined by a second component and the first and second components can be siblings at the same level of the hierarchical list.

In another embodiment, the second visualization can be defined by a second display view, different from the first display view.

In another embodiment, the list of display views can include primary display options and secondary display options.

In another embodiment, the primary display options can include at least one of a status, an event, a plot, and a case history.

In another embodiment the secondary display options can include at least one of an alarm, a list, a bar graph or a defined chart.

In another embodiment the processor can be further configured to generate a second GUI. The second GUI can be configured to display, in a first portion of the second GUI, a list of second navigation objects. Each second navigation object can be associated with a fleet visualization defined by at least one of a selected industrial site, a selected component of the industrial site, and a selected display view of the selected component. The second GUI can also be configured to receive a selection of a second navigation object from the list of second navigation objects. The second GUI can additionally be configured to display, in a second portion of the second GUI, the fleet visualization corresponding to the second navigation object.

In an embodiment, a method is provided. The method can include receiving, by a memory, one or more datasets associated with respective ones of a plurality of components in an industrial environment. The components can include machines and devices configured to acquire operating parameters measured directly from the sensors and calculated therefrom. The method can also include receiving, by a processor, the one or more datasets from the memory. The method can additionally include generating, by the processor, a first graphical user interface (GUI). The first GUI can be configured to display, in a first portion of the first GUI, a hierarchical list of the components and a list of display views corresponding to respective components of the hierarchical list. The first GUI can also be configured to display, in a second portion of the first GUI, a first visualization defined by a first component selected from the hierarchical list and a first display view selected from the list of display views. The first GUI can additionally be configured to display, in the second portion of the first GUI, a first navigation object overlaid with the first visualization. The first navigation object can be associated with a second visualization, different from the first visualization. The first GUI can additionally be configured to update the second portion of the first GUI to display the second visualization in response to selection of the first navigation object.

In another embodiment, the second visualization can be defined by a second component. The first component can be positioned at a first level of the hierarchical list, the second component can be positioned at a second level of the hierarchical list, and the first and second levels can be separated by at least one third level.

In another embodiment, the second visualization can be defined by a second component and the first and second components can be siblings at the same level of the hierarchical list.

In another embodiment, the second visualization can be defined by a second display view, different from the first display view.

In another embodiment, the list of display options can include primary display options and secondary display options.

In another embodiment, the primary display options can include at least one of a status, an event, a plot, and a case history.

In another embodiment, the secondary display options can include at least one of at an alarm, a list, a bar graph or a defined chart.

In another embodiment, the processor can be further configured to generate a second GUI. The second GUI can be configured to display, in a first portion of the second GUI, a list of second navigation objects. Each navigation object can be associated with a fleet visualization defined by at least one of a selected industrial site, a selected component of the industrial site, and a selected display view of the selected component. The second GUI can also be configured to receive a selection of a second navigation object from the list of second navigation objects. The second GUI can be further configured to display, in a second portion of the second GUI, the fleet visualization corresponding to the second navigation object.

In an embodiment, a method is provided. The method can include receiving, by a memory, one or more datasets associated with respective ones of a plurality of components in an industrial environment. The components can include machines and devices configured to acquire operating parameters measured directly from the sensors and calculated therefrom. The method can also include receiving, by a processor, the one or more datasets from the memory. The method can further include generating, by the processor, a graphical user interface (GUI). The GUI can be configured to display, in a first portion of the GUI, a hierarchical list of the components and a list of display views corresponding to respective components of the hierarchical list. The GUI can also be configured to display, in a second portion of the GUI, a first visualization defined by a first component selected from the hierarchical list and a first display view selected from the list of display views. The GUI can be additionally configured to receive a selection of a navigation editing object within the GUI. The GUI can be further configured to display, in a navigation configuration window overlying the first visualization, the navigation configuration window including a list of components of the plurality of components. The GUI can also be configured to receive a component selection from the list of components. The GUI can be additionally configured to display, in the navigation configuration window, a list of display view options associated with the component selection. The GUI can also be configured to receive a second display view selected from the list of display view options. The GUI can be further configured to display, within the first visualization, a navigation object. Selection of the navigation object can be operative to update the second portion of the GUI to display a second visualization defined by the component selection and the second display view.

In another embodiment, the first component can be positioned at a first level of the hierarchical list, the second component can be positioned at a second level of the hierarchical list, and the first and second levels can be separated by at least one third level.

In another embodiment, the second visualization can be defined by a second component and the first and second components can be siblings at the same level of the hierarchical list.

In another embodiment, the second display view can be different from the first display view.

In another embodiment, the list of display view options can include primary display view options and secondary display view options.

In another embodiment, the primary display view options can include at least one of a status, an event, a plot, and a case history.

In another embodiment, the secondary display view options can include at least one of an alarm, a list, a bar graph or a defined chart.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Industrial machinery can be monitored by monitoring systems to ensure operation within acceptable tolerances. In general, machine monitoring can include measuring operating parameters of one or more of the machine components by sensors, determining whether the machine components are operating properly from the operating parameter measurements, and issuing warnings if a machine component is determined to be operating improperly. These warnings can allow corrective action to be taken in advance of machine failure, providing benefits such as lower production costs, reduced equipment down time, improved reliability, and/or improved safety.

Graphical user interfaces (GUIs) can be employed to present visualizations that represent the machines being monitored within a condition monitoring system. In addition to the visualizations, the condition monitoring system may present the data received by the sensors associated with the monitored machines via the GUI. As an example, machine component views are navigated from a first level (e.g., process system) to a second level (e.g., a machine of the process system), to a third level (e.g., a portion of the machine or a supporting sub-system, such as a lube oil system), and so on. Data views can be accessible from respective machine component views. However, navigation between different machine component views in this hierarchical manner limits navigation to direct drilldown/drill up (e.g., direct subordinates and direct superiors in the hierarchy). Accordingly, improved GUIs are provided for condition monitoring systems that allow for non-hierarchical navigation between different machine component views. As discussed in greater detail below, navigations can be provided within respective machine component visualizations, allowing direct navigation between different machine component visualizations and data displays. Beneficially, these navigations can be customized by a user to facilitate individualized workflow.

Embodiments of systems and corresponding methods for monitoring industrial machines are discussed herein. However, embodiments of the disclosure can be employed for monitoring other machines without limit.

Figure 1:
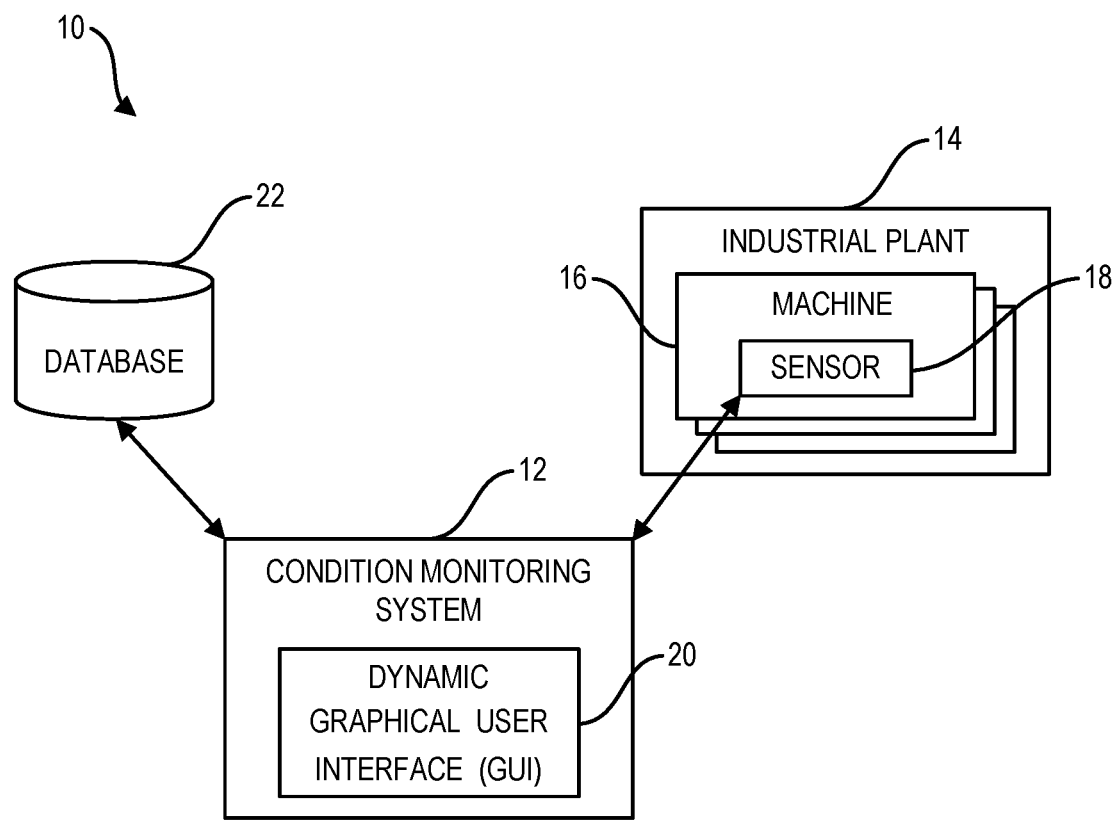
FIG. 1 is a block diagram illustrating one exemplary embodiment of an industrial monitoring system including a condition monitoring system configured to monitor one or more machine components of an industrial plant.

FIG. 1 is a block diagram illustrating one exemplary embodiment of an industrial monitoring system 10 in which various types of machines used for industrial processes can be monitored. The industrial monitoring system 10 can include a condition monitoring system 12, an industrial plant 14, and a database 22. The industrial plant 14 can include any type of industrial environment where different components or machines may be used to complete one or more industrial processes. As such, the industrial plant 14 may correspond to an oil refinery, a manufacturing facility, a turbomachine system, a power generation system, a gasification system, a chemical production system, a gas turbine system, a stream turbine system, a combined cycle system, a power plant, or the like.

The components in the industrial plant 14 can include one or more machines 16 or machine components. Examples of the one or more machines 16 can include motors, gas turbines, heat exchangers, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, and the like.

One or more of the sensors 18 can be associated with each machine 16. The sensors 18 can be any sensor configured to acquire information with respect to the operation of the respective machine 16. Examples of the sensors 18 can include temperature sensors, current sensors, voltage sensors, pressure sensors, displacement sensors, velocity sensors, acceleration sensors, flow sensors, clearance sensors, flame sensors, gas composition sensors, vibration sensors, and the like. Measurements acquired by the sensors 18 may be received by a memory 28 of the condition monitoring system 12, a processor 26 of the condition monitoring system 12 and combinations thereof via a direct link (i.e., hardwired), a network link, or a portable memory device (e.g., Universal Serial Bus memory drive).

Figure 2:
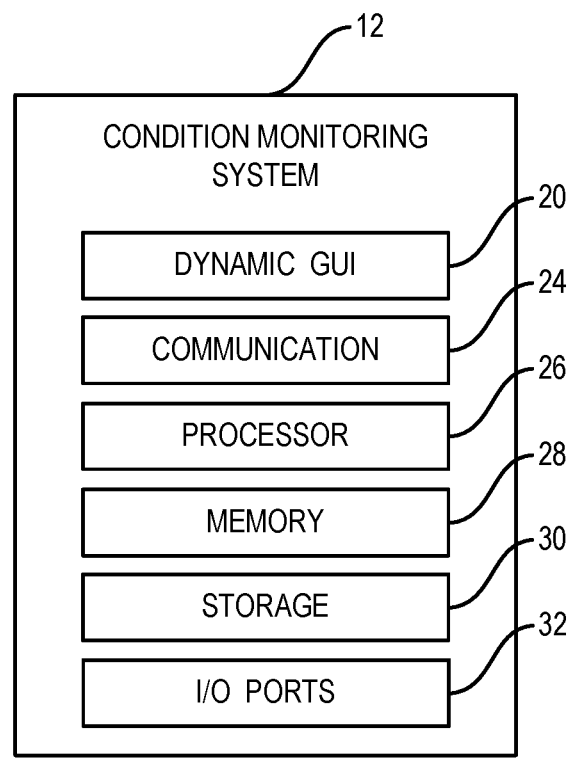
FIG. 2 is a block diagram illustrating one exemplary embodiment of the condition monitoring system of FIG. 1.

As shown in FIG. 2, the condition monitoring system 12 can include components configured to display data, process data, and analyze data. As shown, the condition monitoring system 12 includes a communication component 24, a processor 26, a memory 28, a data storage 30, input/output (I/O) ports 32, and the like. The communication component 24 can be a wireless or wired communication component that facilitates communication between the condition monitoring system 12, the machines 16, the sensors 18, the database 22, other control or monitoring systems, and the like. The processor 26 can be any type of computer processor or microprocessor capable of executing computer-executable code. The memory 28 and the data storage 30 can be any suitable articles of manufacture that can serve as media to store processor-executable code, data, or the like. These articles of manufacture may represent non-transitory computer-readable media (i.e., any suitable form of memory or storage) that may store the processor-executable code used by the processor 26 to, among other things, analyze data and dynamically link analyzed data with visualizations displayed and selected via a graphical user interface (GUI)

20. The non-transitory computer-readable media merely indicates that the media is tangible and not a signal.

The processor 26 can be configured to generate the graphical user interface (GUI) 20 that configured for display upon a display device. The GUI 20 can include visualizations that represent the machines 16 and the sensors 18 being monitored by the condition monitoring system 12. As such, users of the condition monitoring system 12 may monitor the health or status of machines 16 in the industrial plant 14 via the GUI 20. The condition monitoring system 12 can be used to measure one or more process systems including multiple machines 16 (e.g., steam turbine systems, hydraulic turbine systems, wind turbine systems, reactors, gasifiers, gas treatment systems, industrial automation systems, or other suitable process systems).

The GUI 20 can enable the user to perform various types of data processing or analysis using tools provided by the condition monitoring system 12 or by separate data processing or analysis products. As an example, a user can generate a graph plotting a statistical trend of data acquired by a particular sensor 18 over time. In one embodiment, after the statistical trend graph has been generated, the user may dynamically control the data being analyzed by the tool by selecting a different sensor 18 visualization displayed in the GUI 20.

In addition to current data acquired by the sensors 18, the condition monitoring system 12 can receive other data from the database 22. In one aspect, the condition monitoring system 12 can receive historical data related to the data acquired by the sensors 18. In another aspect, the condition monitoring system can receive calculated data associated with a machine 16 or sensor 18, results from previous data processing or analysis functions performed on data associated with a machine 16 or sensor 18, or other contextual data related to the industrial plant 14. For example, the database 22 may include data related to the historical operating conditions (e.g., when operating at full capacity) of the industrial plant 14 such as a plant historian or the like.

Figure 3:
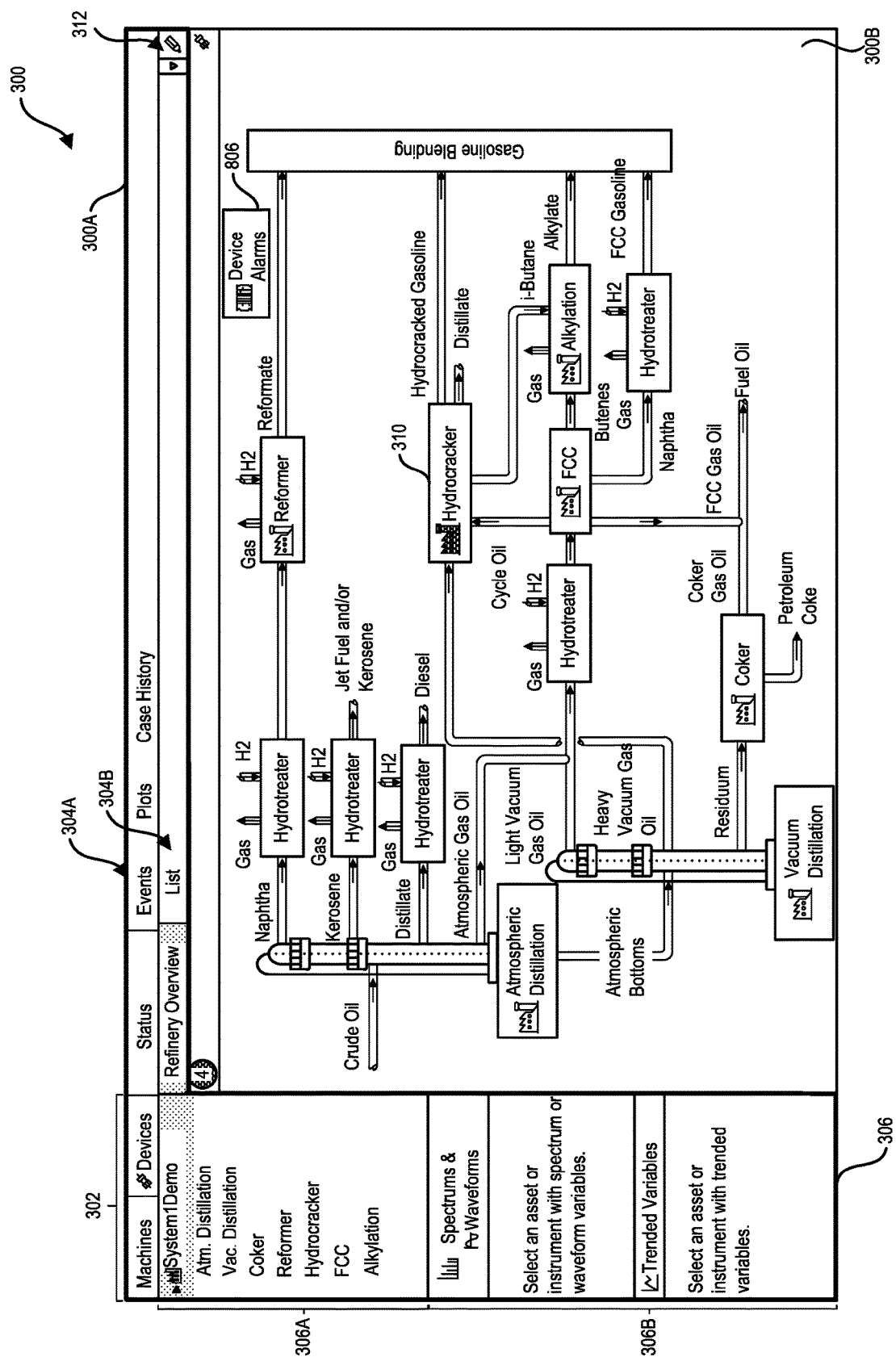
FIG. 3 is a diagram illustrating one exemplary embodiment of a graphical user interface (GUI) generated by the condition monitoring system of FIG. 2 displaying a visualization of components of the industrial plant at a first hierarchical level.

FIG. 3 is a block diagram illustrating one exemplary embodiment of the GUI 20 in the form of GUI 300. The GUI 300 includes a first portion 300A and a second portion 300B. As discussed in detail below, the first GUI portion 300A includes user selectable options, while the second GUI portion 300B is updated to display visualizations of the machines 16 corresponding to options selected within the first GUI portion 300A.

As shown, the first GUI portion 300A includes component options 302, primary display options 304A, secondary display options 304B, and a plurality of view spaces 306 (e.g., 306A, 306B) having content that dynamically changes in response to selections from the component options 302. As shown, the component options 302 can include machines and condition monitoring devices (e.g., physical monitors).

The primary display options 304A can include status, events, plots, and case history associated with machine or device selected from the component options 302. Status can include a condition of the selected component option based upon one or more measurements acquired by the sensors 18 (e.g., Satisfactory, Unsatisfactory, Warning, Alarm, etc.) Events can be alarm and/or system logs that alert the user to potential component health issues (e.g., a measured parameter exceeding a threshold value). Plots can include any graphical representation of measured data. The case history can include plots of historical data and historical reports of machine condition.

The secondary display options 304B can include sub-types of displays views based upon the selected component option 302 and the selected primary display option 304A. Examples of display sub-types can include alarms, a type of defined charting view (e.g. vibration, surge curve) and/or a type of display (e.g., list, bar graph, etc.)

The dynamic view spaces 306 can include a first dynamic view space (e.g., a hierarchical view space 306A) and a second dynamic view space (e.g., a measurement view space 306B). When a machine or device is selected in the component options 302, the hierarchical view space 306A can be updated to display monitored machine components or devices in a hierarchical view. As an example, machine components can be displayed in a hierarchy including a first level (e.g., a site level), a second level (e.g., a process system level), and a third level (e.g., a machine level). Devices can be displayed with a first level (e.g., a monitoring device), a second level (e.g., a measurement channel), and the like. Greater or fewer hierarchical levels can be employed for the machines and devices without limit.

The measurement view space 306B can display types of operating parameters derived from measurements acquired from sensors 18 (e.g., acceleration, temperature, speed, displacement, gap distance, etc.) Under circumstances where operating parameters are displayed in a data visualization within the second GUI portion 300B (e.g., a plot), the displayed operating parameter can be selected from the measurement view space 306B.

The GUI 300 of FIG. 3 illustrates a visualization displayed in the second GUI portion 300B corresponding to selection of a machine from the component options 302, a view selected from the primary display options 304A, and a view selected from the secondary display options 304B. The hierarchical view space 306A displays the machine components at a first component level (e.g., a site level in the context of a refinery). As shown, this site-level visualization includes a plurality of process systems 310 (e.g., atmospheric distillation, vacuum distillation, coker, reformer, hydrocracker, fluid catalytic cracking (FCC), and alkylation). Connections between respective process systems 310 (e.g., fluid pathways) are also illustrated.

Figure 4:
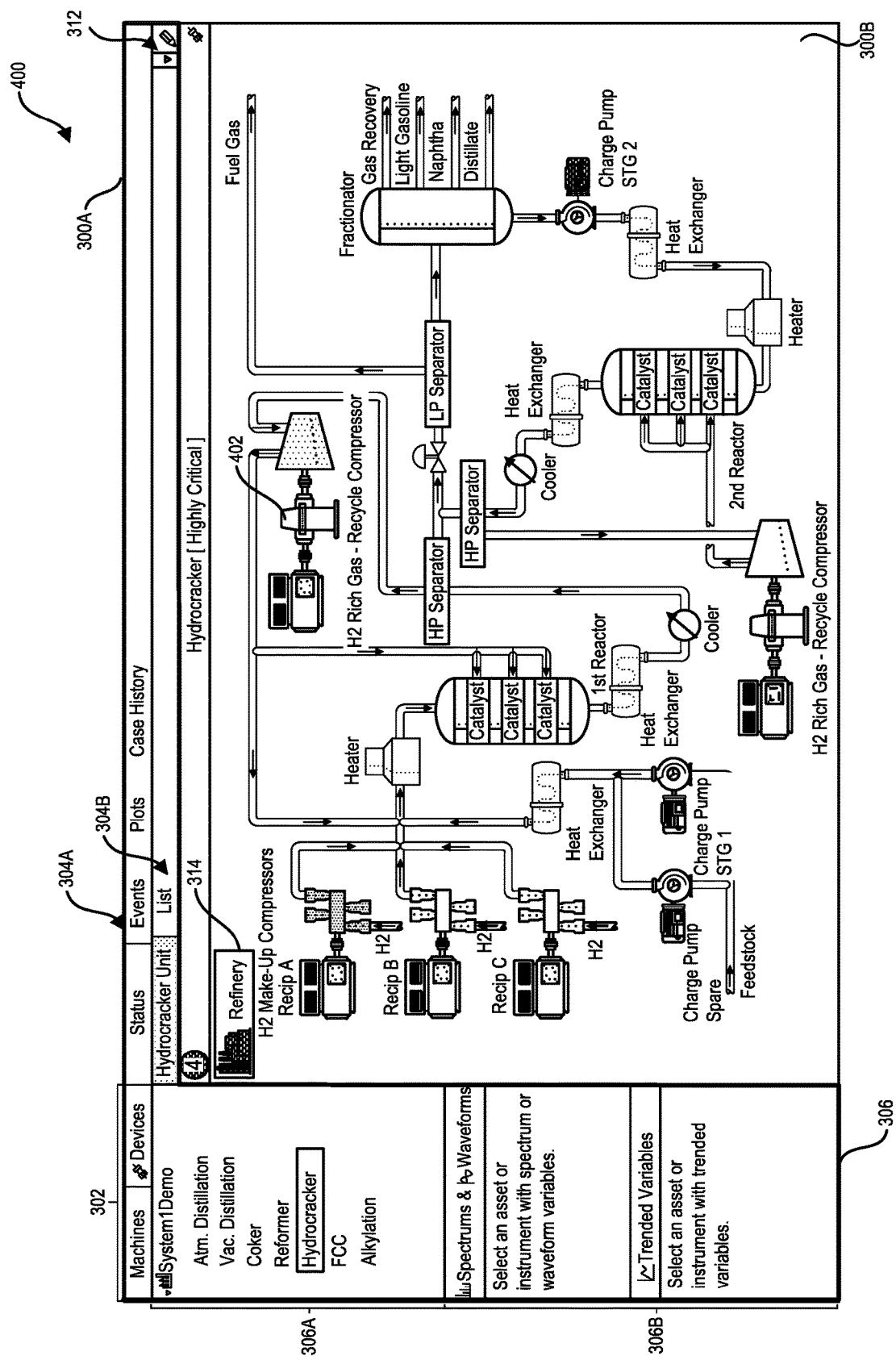
FIG. 4 is a diagram illustrating one exemplary embodiment of a GUI generated by the condition monitoring system of FIG. 2 displaying a visualization of components of the industrial plant at a second hierarchical level.

FIG. 4 illustrates the GUI 20 in the form of GUI 400 that includes a visualization displayed in the second GUI portion 300B corresponding to selection of a process system ((e.g., a hydrocracker process system) from the plurality of process systems 310 displayed in the GUI of FIG. 3. As shown, this visualization includes a plurality of machines 402 associated with the process system 310 in the form of a hydrocracker process system (e.g., make up compressors, recycle compressors, charge pumps, etc.)

Figure 5:
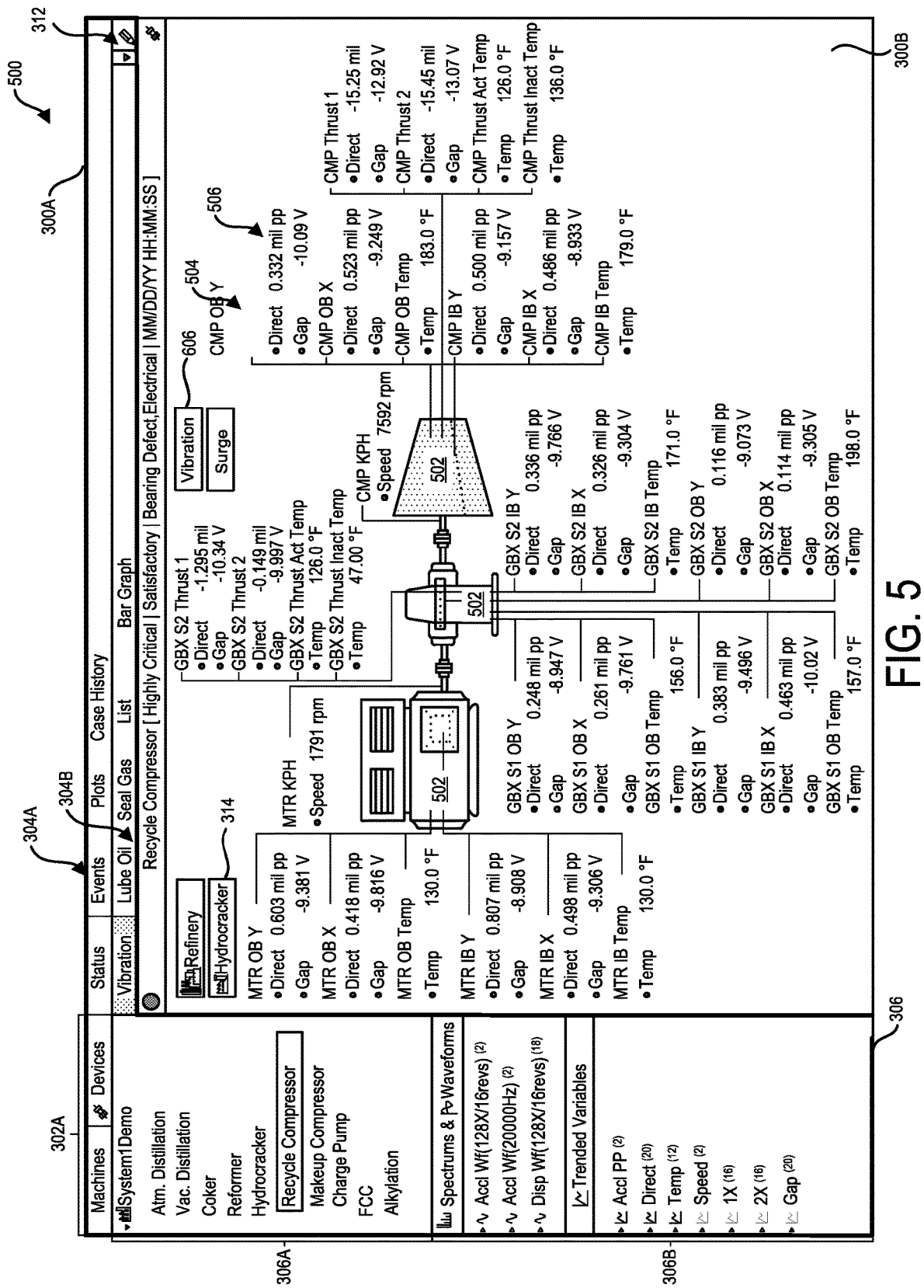
FIG. 5 is a diagram illustrating one exemplary embodiment of a GUI generated by the condition monitoring system of FIG. 2 displaying a visualization of components of the industrial plant at a third hierarchical level.

FIG. 5 illustrates the GUI 20 in the form of GUI 500 including a visualization displayed in the second GUI portion 300B corresponding to selection of a machine (e.g., a recycle compressors) from the plurality of machines 402 displayed in the GUI of FIG. 4. This visualization includes a plurality of machine components 502. Also shown are data fields 504 that display data entries 506 associated with a respective machine component 502. The data entries 506 can include operational parameters such as real-time measurement data received from various sensors 18 disposed on a respective machine component 502, outputs of analyses performed by the processor 26 based upon measurement data received from various sensors 18 disposed on a respective machine component 502, or the like. GUI 500 further updates the measurement view space 306B to display operational parameters (e.g., acceleration, temperature, speed, displacement, gap distance, etc.) associated with a selected machine component 502.

Embodiments of the condition monitoring system 12 can be further configured to facilitate non-hierarchical navigation between different embodiments of the GUI 20 (e.g., GUIs 300, 400, 500, data visualizations, etc.) using navigation objects. As discussed in greater detail in the examples below, the GUI 20 can further display an edit object 312. Selection of the edit object 312 can open a configuration window allowing selection of options from the component options 302, the primary display options 304A, and the secondary display options 304B. Following these selections, a corresponding navigation object 314 is generated and displayed within the embodiment of the GUI 20 from which the edit object is selected.

Beneficially, the ability of a user to generate customized navigation objects 314 within any embodiment of the GUI 20 allows a user to customize their workflow and navigate directly between any visualizations that can be rendered within the GUI 20, regardless of their relative positions within the hierarchical list. In one embodiment, navigation can be performed between a first component at a first level of the hierarchical list and a second component at a second level of a hierarchical list, where the first and second levels are not adjacent to one another (e.g., at least one third level is interposed between the first and second levels). In another embodiment, navigation can be performed between first and second components at the same level of the hierarchical list. In contrast, existing condition monitoring system can be limited to direct drill up/drill down navigation between parent and child levels of the component hierarchy and can be further limited to status displays. In this manner, users can employ the condition monitoring system 12 more efficiently to diagnose the health of monitored machines 16.

Example 1

Figure 6:
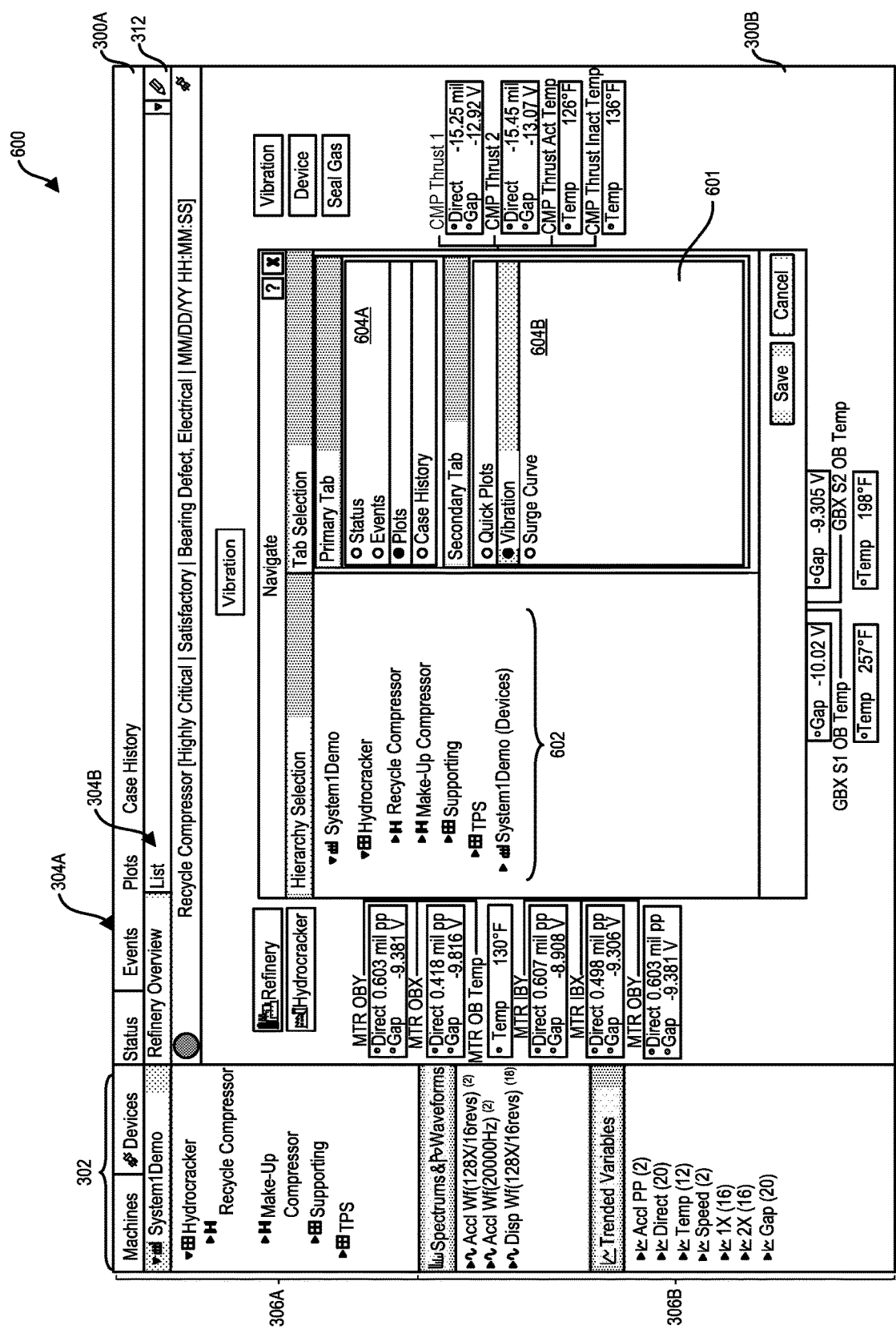
FIG. 6 is a diagram illustrating one exemplary embodiment of a GUI generated by the condition monitoring system of FIG. 2 displaying a first configuration window configured to generate a first navigation object.

FIG. 6 illustrates the GUI 20 in the form of GUI 600. As shown, the background includes GUI 500 including the visualization displayed in the second GUI portion 300B corresponding to selection of a machine from the plurality of machines 402 displayed in the GUI of FIG. 4. The foreground includes a configuration window 601 including component selection options 602, primary display options 604A, and secondary display options 604B. For illustration purposes, the recycle compressor machine is selected from the component selection options 602, plots is selected from the primary display options 604A, and vibration is selected from the secondary display options 604B. These selections can be saved (selection of a save button within the configuration window 601) and a corresponding navigation object 606 ("Vibration") is displayed within the GUI 500 displaying the recycle compressor.

Figure 7:
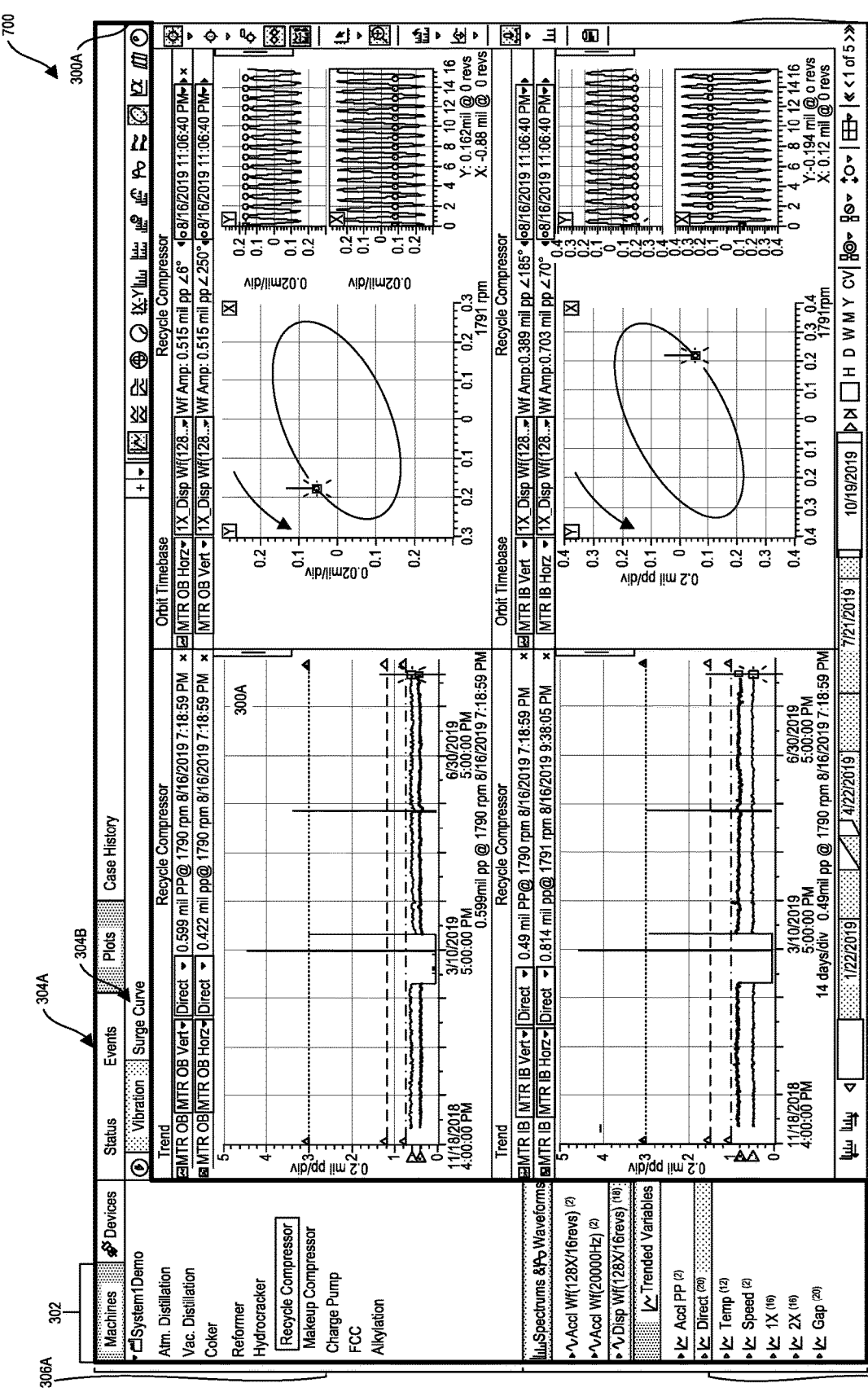
FIG. 7 is a diagram illustrating one exemplary embodiment of a GUI generated by the condition monitoring system of FIG. 2 in response to selection of the first navigation object generated from the first configuration window of FIG. 6.

FIG. 7 illustrates the GUI 20 in the form of GUI 700. GUI 700 is generated in response to selection of the navigation object 606 in GUI 600 and updates the second GUI portion 300B to display data visualizations including vibration plots 702 corresponding to the recycle compressor. The measurements populated within the plots can be selected from those displayed within the measurement view space 306B.

Example 2

Figure 8:
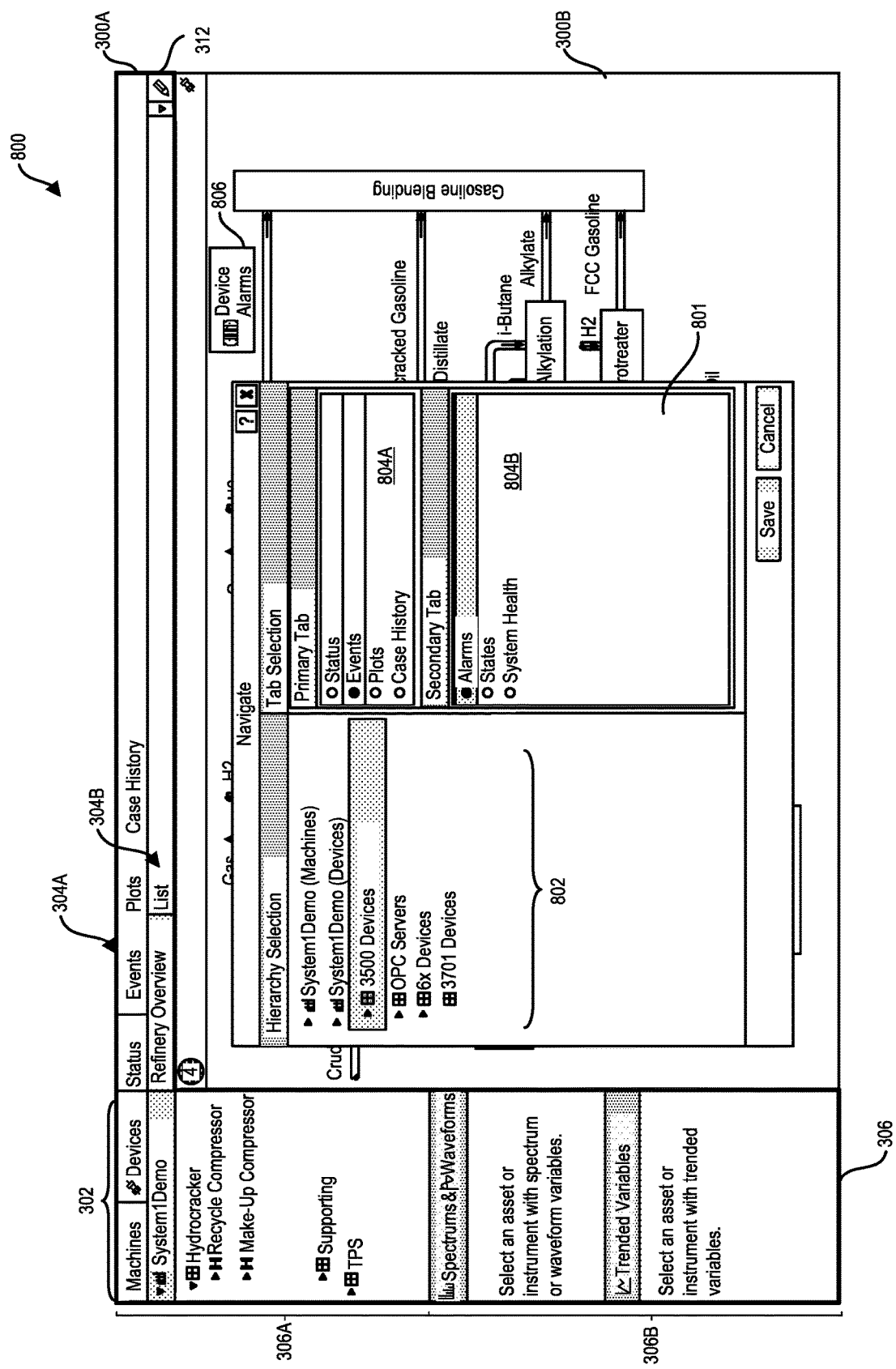
FIG. 8 is a diagram illustrating one exemplary embodiment of a GUI generated by the condition monitoring system of FIG. 2 displaying a second configuration window configured to generate a second navigation object.

FIG. 8 illustrates the GUI 20 in the form of GUI 800. As shown, the background includes GUI 300 with a visualization displayed in the second GUI portion 300B corresponding to selection of a first component level (e.g., a site level) from the component options 302, status selected from the primary display options 304A, and list selected from the secondary display options 304B. The foreground includes a configuration window 801 including component selection options 802, primary display options 804A, and secondary display options 804B. For illustration purposes, a 3500 device (e.g., Bently Nevada 3500 series machinery monitoring system) is selected from the component selection options 802, events is selected from the primary display options 804A, and alarms is selected from the secondary display options 804B. These selections can be saved (selection of a save button within the configuration window 801) and a corresponding navigation object 806 ("Vibration") is displayed within the GUI 300 displaying the site (e.g., a refinery).

Figure 9:
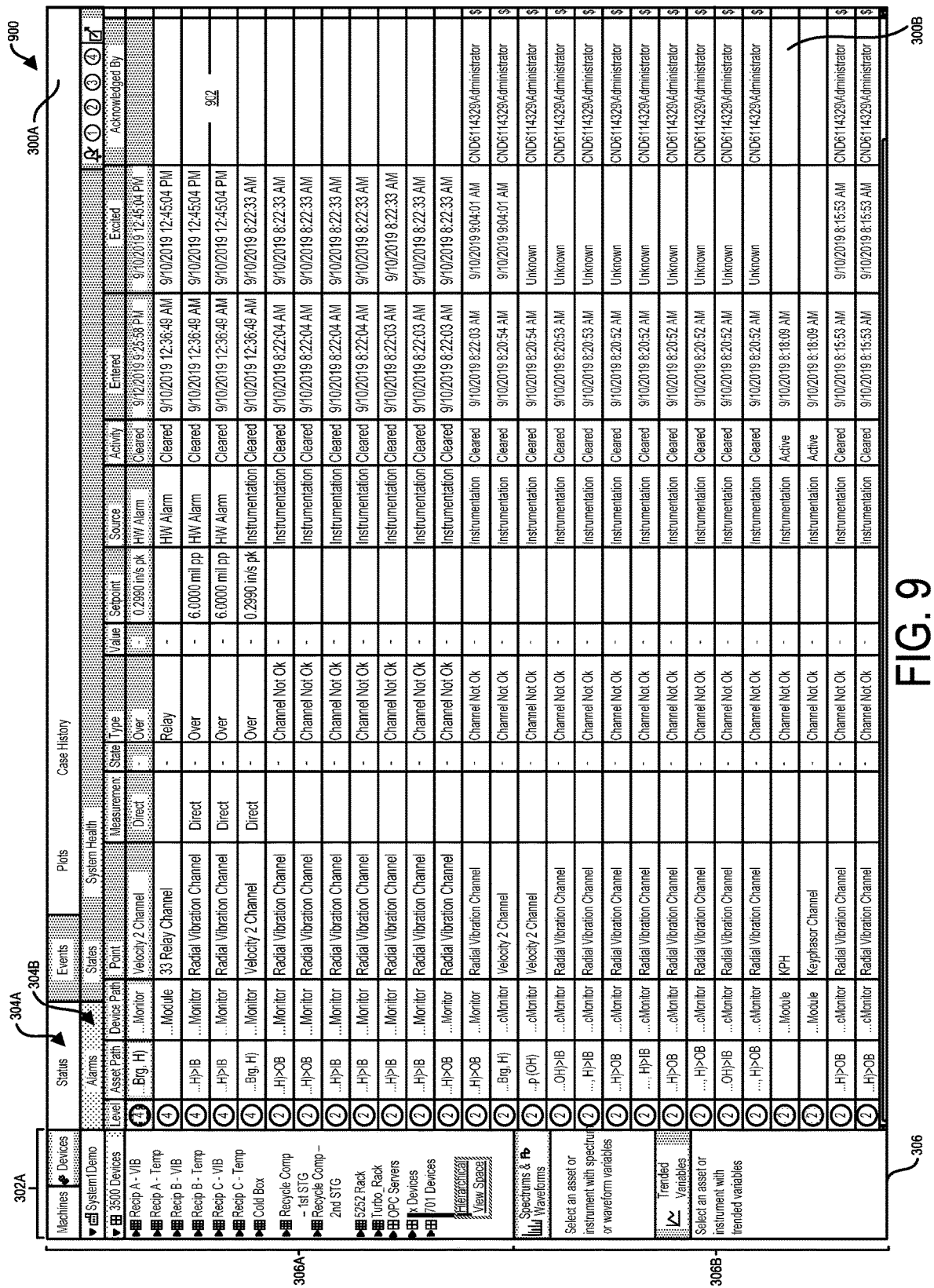
FIG. 9 is a diagram illustrating one exemplary embodiment of a GUI generated by the condition monitoring system of FIG. 2 in response to selection of the second navigation object generated from the second configuration window of FIG. 8.

FIG. 9 illustrates the GUI 20 in the form of GUI 900. GUI 900 is generated in response to selection of the navigation object 806 in GUI 800 and updates the second GUI portion 300B to display data visualizations including events 902 corresponding to the device selected in the component selection options 802.

Example 3

Figure 10A:
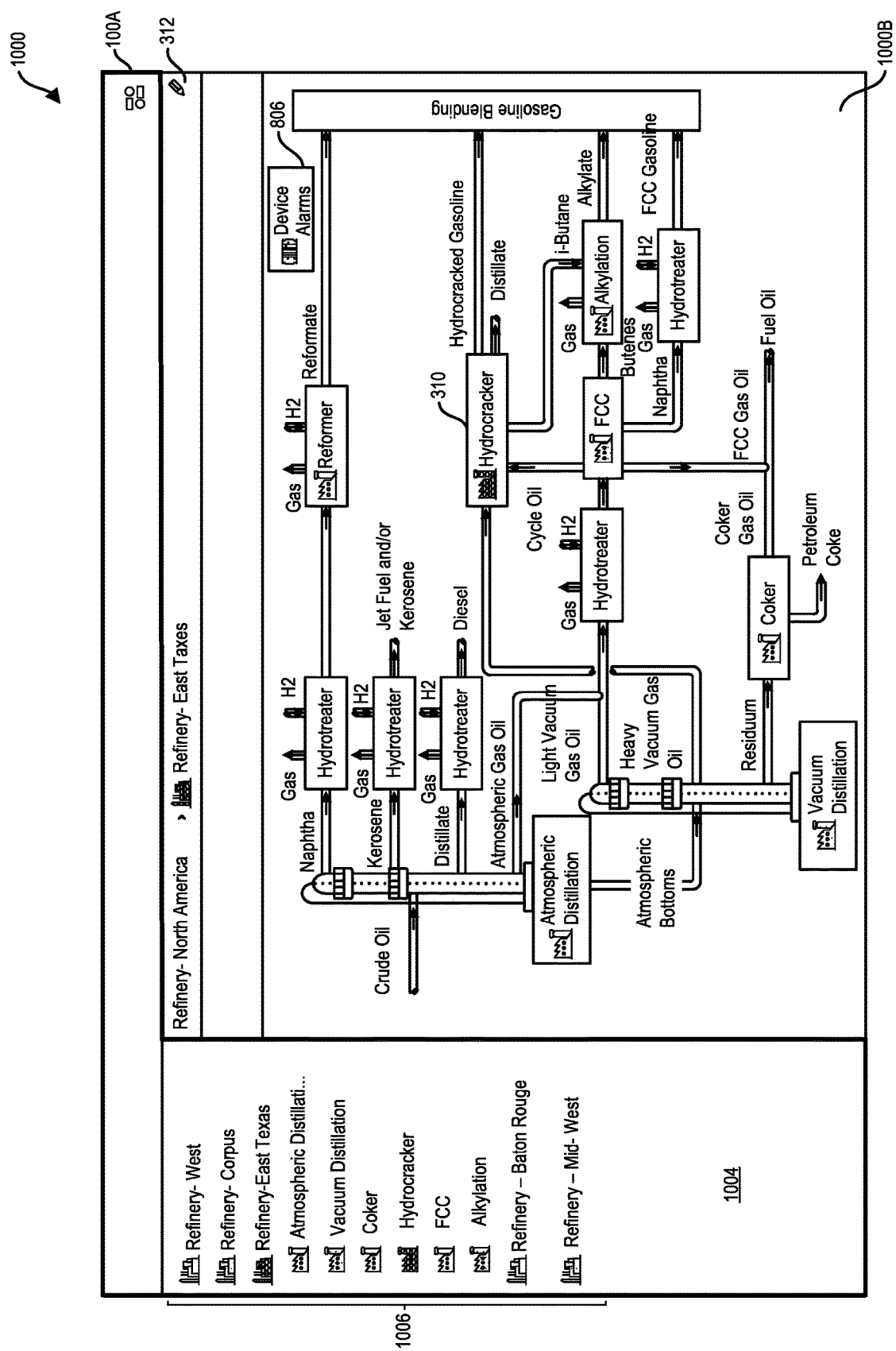
FIG. 10A is a diagram illustrating one exemplary embodiment of a fleet GUI generated by the condition monitoring system of FIG. 2 displaying a plurality of fleet navigation objects and a visualization of components of a fleet in accordance with a selected navigation object.
Figure 10B:
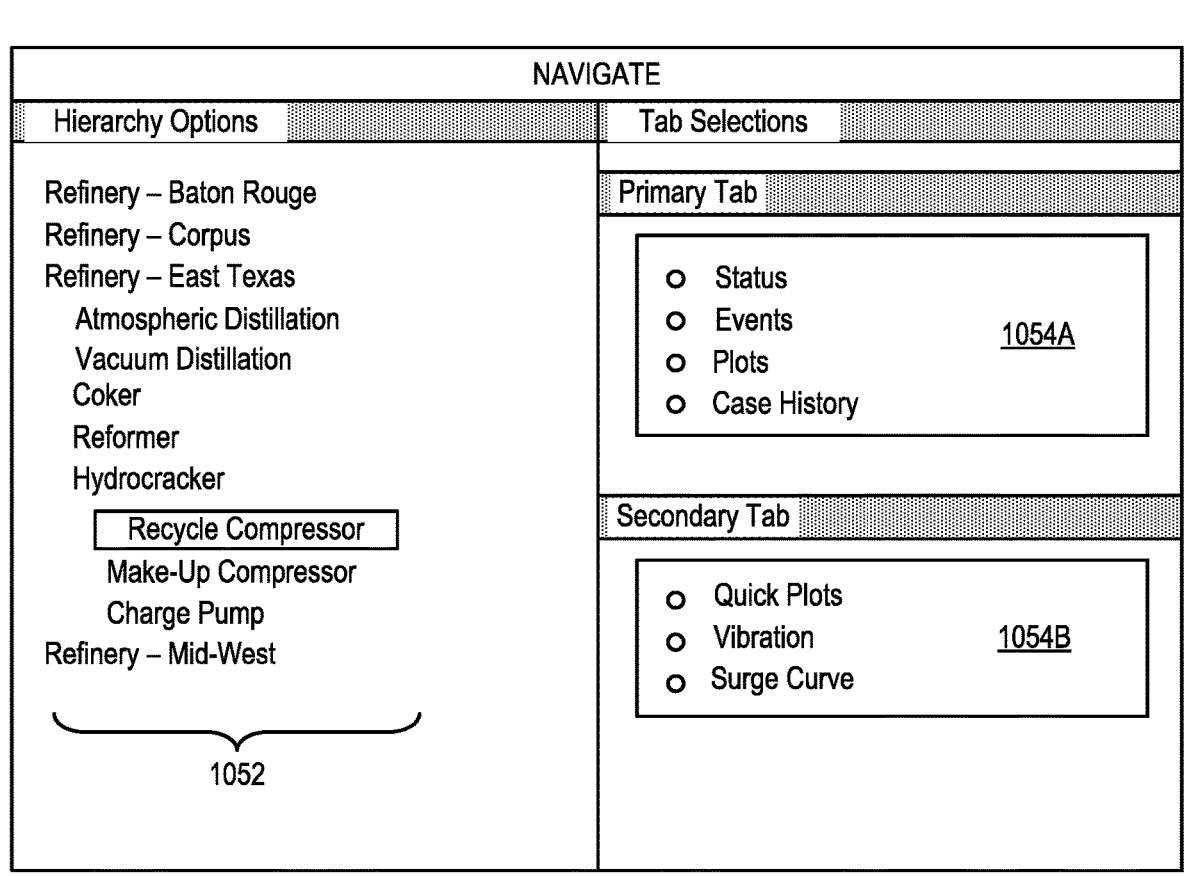
FIG. 10B is a diagram illustrating one exemplary embodiment of a GUI generated by the condition monitoring system of FIG. 2 displaying a fleet configuration window configured to generate a fleet navigation object.

FIG. 10A illustrates a fleet GUI 1000. The fleet GUI 1000 can extend embodiments of GUI 20 discussed above to a fleet level including multiple sites. As shown, the fleet GUI 1000 includes a first GUI portion 1000A and a second GUI portion 1000B. The first GUI portion 1000A includes a hierarchical view space 1004 including a plurality of hierarchically organized fleet navigation objects 1006. In general, selection of a navigation object from the plurality of fleet navigation objects 1006 updates the second GUI portion 1000B to display a visualization corresponding to the selected fleet navigation object (e.g., at least one of a selected site, a selected component of the selected site, and a selected display view of the selected component).

In one aspect, a fleet navigation object 1006 can be configured for navigation to a visualization of a predetermined industrial site and display view within the fleet. As an example, FIG. 10A illustrates a fleet navigation object "Refinery—West" in the first GUI portion 1000A. Selection of this fleet navigation object in the first GUI portion 1000A can result in display of a visualization representing the West Refinery site the second GUI portion 1000B.

In another aspect, a fleet navigation object 1006 can be configured for navigation to a visualization of a predetermined component and display view of an industrial site within the fleet. As an example, FIG. 10A further illustrates a fleet navigation object "Refinery—East Texas" and respective fleet navigation objects for components of the East Texas refinery (e.g., Atmospheric Distillation, Vacuum Distillation, Coker, Hydrocracker, FCC, and Alkylation) in the first GUI portion 1000A. Selection the fleet navigation object of a component within the first GUI portion 1000A can result in display of a visualization representing that component and a predetermined display view within the second GUI portion 1000B.

While not shown, further fleet hierarchical levels can be employed. Examples of such fleet hierarchical levels can include geographic regions of increasing size (e.g., states/provinces, countries, continents, etc.), business units, and the like.

Figure 11:
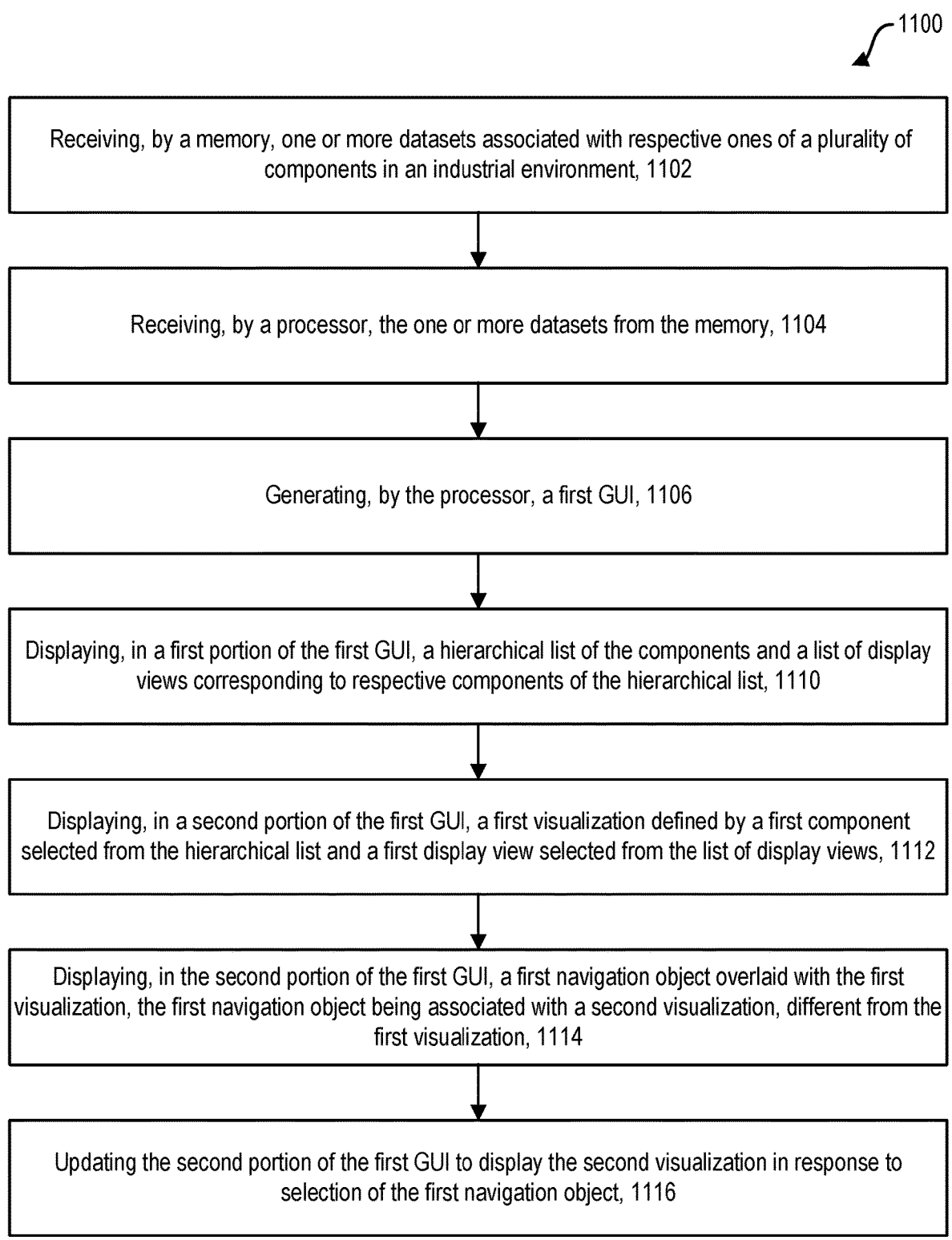
FIG. 11 is a flow diagram illustrating one exemplary embodiment of a method for generating a graphical user interface.

FIG. 11 is a flow diagram illustrating an exemplary embodiment of a method 1100 for monitoring a machine. The method 1100 can provide for non-hierarchical navigation between visualizations displayed by a GUI. The method 1100 is discussed in with reference to the condition monitoring system 12 (e.g., FIGS. 1-10) and can include operations 1102-1116. In certain aspects, embodiments of the method 1100 can include greater or fewer operations than illustrated in FIG. 11 and the operations can be performed in a different order than illustrated in FIG. 11.

In operation 1102, a memory can receive one or more datasets associated with respective ones of a plurality of components in an industrial environment. The components can include machines and devices configured to acquire operating parameters measured directly from the sensors and calculated therefrom.

In operation 1104, a processor can receive the one or more datasets from the memory. However, in alternative embodiments, the processor can receive at least a portion of the one or more datasets from one or more other sources (e.g., sensors acquiring parameters of a component)

In operation 1106, the processor can generate a first graphical user interface (GUI).

In operation 1110, a first portion of the first GUI can display a hierarchical list of the components and a list of display views corresponding to respective components of the hierarchical list. As discussed above, the components can include machines and devices. The list of display views can include primary display options and secondary display options. The primary display options can include at least one of a status, an event, a plot, or a case history. The secondary display options can include at least one of an alarm, a list, a bar graph or a defined chart In operation 1112, a second portion of the first GUI can display a first visualization. The first visualization can be defined by a first component selected from the hierarchical list and a first display view selected from the list of display views.

In operation 1114, the second portion of the first GUI can display a first navigation object overlaid with the first visualization. The first navigation object can be associated with a second visualization, different from the first visualization. In one aspect, the second visualization can be defined by a second component. The first component can be positioned at a first level of the hierarchical list and the second component can be positioned at a second level of the hierarchical list. The first and second levels can be separated by at least one third level. In another aspect, the second visualization can be defined by a second component, where the first and second components are siblings at the same level of the hierarchical list. Accordingly, the first and second visualizations can be non-hierarchical (e.g., not a direct parent-child relationship) with respect to the hierarchical list.

In operation 1116, the second portion of the first GUI can be updated to display the second visualization in response to selection of the first navigation object. In this manner, user of the first navigation object can facilitate non-hierarchical navigation (e.g. navigation between visualizations that are not in a direct parent-child relationship) with respect to the hierarchical list.

Figure 12:
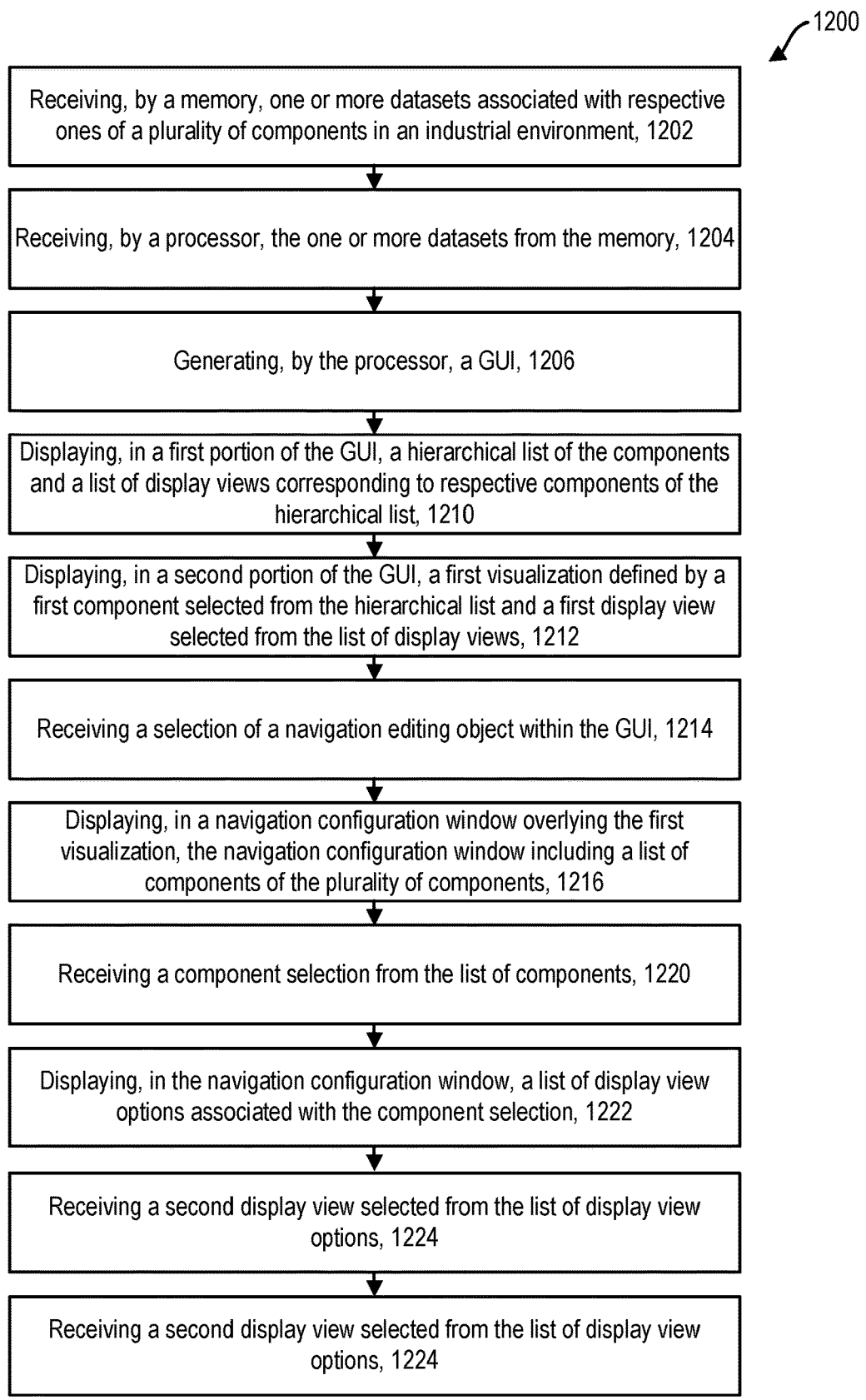
FIG. 12 is a flow diagram illustrating another exemplary embodiment of a method for generating a graphical user interface.

FIG. 12 is a flow diagram illustrating an exemplary embodiment of a method 1300 for generating navigation objects for use within a GUI. The navigation objects can provide non-hierarchical navigation between visualizations displayed by the GUI. The method 1200 is discussed in with reference to the condition monitoring system 12 (e.g., FIGS. 1-10) and can include operations 1202-1124. In certain aspects, embodiments of the method 1200 can include greater or fewer operations than illustrated in FIG. 12 and the operations can be performed in a different order than illustrated in FIG. 12.

In operation 1202, a memory can receive one or more datasets associated with respective ones of a plurality of components in an industrial environment. The components can include machines and devices configured to acquire operating parameters measured directly from the sensors and calculated therefrom.

In operation 1204, a processor can receive the one or more datasets from the memory. However, in alternative embodiments, the processor can receive at least a portion of the one or more datasets from one or more other sources (e.g., sensors acquiring parameters of a component)

In operation 1206, the processor can generate a graphical user interface (GUI).

In operation 1210, a first portion of the GUI can display a hierarchical list of the components and a list of display views corresponding to respective components of the hierarchical list. As discussed above, the components can include machines and devices. The list of display views can include primary display options and secondary display options. The primary display options can include at least one of a status, an event, a plot, or a case history. The secondary display options can include at least one of an alarm, a list, a bar graph or a defined chart In operation 1212, a second portion of the first GUI can display a first visualization. The first visualization can be defined by a first component selected from the hierarchical list and a first display view selected from the list of display views.

In operation 1214, a selection of a navigation editing object can be received within the GUI. As an example, a user can select an edit object from the GUI.

In operation 1216, the GUI can display a navigation configuration window overlying the first visualization in response to selection of the navigation editing object. The navigation configuration window can include a list of components of the plurality of components In operation 1216, a component selection from the list of components can be received. As discussed above, the components can include machines and devices.

In operation 1220, the GUI can also display, within the navigation configuration window, a list of display view options associated with the component selection. The list of display view options can include primary display options and secondary display options. The primary display options can include at least one of a status, an event, a plot, or a case history. The secondary display options can include at least one of an alarm, a list, a bar graph or a defined chart.

In operation 1222, a navigation object can be displayed within the first visualization. The navigation object can be displayed after selection of the component and the display view options within the navigation configuration window.

In operation 1224, the second portion of the GUI can be updated to display a second visualization in response to selection of the navigation object. The second visualization can be defined by the component selection and the second display view.

Exemplary technical effects of the methods, systems, and devices described herein include, by way of non-limiting example, definition of customized workflows within a graphical user interface of a condition monitoring system and increased navigation efficiency of users when monitoring health of machines with the condition monitoring system.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such w-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A condition monitoring system, comprising:
a memory configured to receive one or more datasets associated with respective ones of a plurality of components in an industrial environment, wherein the components include machines and devices configured to acquire operating parameters of the machines; and
a processor configured to receive the one or more datasets from the memory and to generate a first graphical user interface (GUI), wherein the first GUI is configured to:
display, in a first portion of the first GUI, a hierarchical list of the components and a list of display views corresponding to respective components of the hierarchical list;
display, in a second portion of the first GUI, a first visualization defined by a first component selected from the hierarchical list and a first display view selected from the list of display views;
display a first navigation object overlaid with the first visualization, the first navigation object associated with a second visualization, different from the first visualization, wherein the second visualization is non-hierarchical with respect to the first visualization; and
update the second portion of the first GUI to display the second visualization in response to selection of the first navigation object, wherein the second visualization is provided in response to selection of a second display view different than the first display view, the second display view selected from an updated list of display views modified based on a component selection from the plurality of components and a selection from primary display options.

2. The condition monitoring system of claim 1, wherein the second visualization is defined by a second component, wherein the first component is positioned at a first level of the hierarchical list and the second component is positioned at a second level of the hierarchical list, and wherein the first and second levels are separated by at least one third level.

3. The condition monitoring system of claim 1, wherein the second visualization is defined by a second component, wherein the first and second components are siblings at the same level of the hierarchical list.

4. The condition monitoring system of claim 1, wherein the list of display views includes secondary display options.

5. The condition monitoring system of claim 1, wherein the primary display options include at least one of a status, an event, a plot, or a case history.

6. The condition monitoring system of claim 4, wherein the secondary display options include at least one of an alarm, a list, a bar graph or a defined chart.

7. The condition monitoring system of claim 1, wherein the processor is further configured to generate a second GUI, wherein the second GUI is configured to:
display, in a first portion of the second GUI, a list of second navigation objects, wherein each second navigation object is associated with a fleet visualization defined by at least one of a selected industrial site, a selected component of the industrial site, or a selected display view of the selected component;
receive a selection of a second navigation object from the list of second navigation objects; and
display, in a second portion of the second GUI, the fleet visualization corresponding to the second navigation object.

8. A method, comprising:
receiving, by a memory, one or more datasets associated with respective ones of a plurality of components in an industrial environment, wherein the components include machines and devices configured to acquire operating parameters of the machines;
receiving, by a processor, the one or more datasets from the memory; and
generating, by the processor, a first graphical user interface (GUI), wherein the first GUI is configured to:
display, in a first portion of the first GUI, a hierarchical list of the components and a list of display views corresponding to respective components of the hierarchical list;
display, in a second portion of the first GUI, a first visualization defined by a first component selected from the hierarchical list and a first display view selected from the list of display views;
display, in the second portion of the first GUI, a first navigation object overlaid with the first visualization, wherein the first navigation object is associated with a second visualization, different from the first visualization, wherein the second visualization is non-hierarchical with respect to the first visualization; and
update the second portion of the first GUI to display the second visualization in response to selection of the first navigation object , wherein the second visualization is provided in response to selection of a second display view different than the first display view, the second display view selected from an updated list of display views modified based on a component selection from the plurality of components and a selection from primary display options.

9. The method of claim 8, wherein the second visualization is defined by a second component, wherein the first component is positioned at a first level of the hierarchical list and the second component is positioned at a second level of the hierarchical list, and wherein the first and second levels are separated by at least one third level.

10. The method of claim 8, wherein the second visualization is defined by a second component, wherein the first and second components are siblings at the same level of the hierarchical list.

11. The method of claim 8, wherein the list of display views include secondary display options.

12. The method of claim 8, wherein the primary display options include at least one of a status, an event, a plot, or a case history.

13. The method of claim 11, wherein the secondary display options include at least one of an alarm, a list, a bar graph or a defined chart.

14. The method of claim 8, wherein the processor is further configured to generate a second GUI, wherein the second GUI is configured to:
display, in a first portion of the second GUI, a list of second navigation objects, wherein each navigation object is associated with a fleet visualization defined by at least one of a selected industrial site, a selected component of the industrial site, or a selected display view of the selected component;

receive a selection of a second navigation object from the list of second navigation objects; and display, in a second portion of the second GUI, the fleet visualization corresponding to the second navigation object.

15. A method, comprising:

receiving, by a memory, one or more datasets associated with respective ones of a plurality of components in an industrial environment, wherein the components include machines and devices configured to acquire operating parameters of the machines;

receiving, by a processor, the one or more datasets from the memory; and generating, by the processor, a graphical user interface (GUI), wherein the GUI is configured to:

display, in a first portion of the GUI, a hierarchical list of the components and a list of display views corresponding to respective components of the hierarchical list;

display, in a second portion of the GUI, a first visualization defined by a first component selected from the hierarchical list and a first display view selected from the list of display views;

receive a selection of a navigation editing object within the GUI;

display, in a navigation configuration window overlying the first visualization, the navigation configuration window including a list of components of the plurality of components;

receive a second component selection from the list of components;

display, in the navigation configuration window, a list of display view options associated with the second component selection;

receive a second display view selected from the list of display view options; and display, within the first visualization, a navigation object;

wherein selection of the navigation object is operative to update the second portion of the GUI to display a second visualization defined by the second component selection and the second display view, and wherein the second visualization is non-hierarchical with respect to the first visualization, and wherein the second visualization is provided in response to selection of the second display view different than the first display view, the second display view selected from an updated list of display views modified based on the second component selection and a selection from primary display view options.

16. The method of claim 15, wherein the first component is positioned at a first level of the hierarchical list and the second component is positioned at a second level of the hierarchical list, and wherein the first and second levels are separated by at least one third level.

17. The method of claim 15, wherein the first and second components are siblings at the same level of the hierarchical list.

18. The method of claim 15, wherein the list of display view options includes secondary display view options.

19. The method of claim 15, wherein the primary display view options include at least one of a status, an event, a plot, or a case history.

20. The method of claim 18, wherein the secondary display view options can include at least one of an alarm, a list, a bar graph or a defined chart.

* * * * *